United States Patent
Shan et al.

(10) Patent No.: US 7,825,611 B2
(45) Date of Patent: Nov. 2, 2010

(54) ILLUMINATION ADJUSTING DEVICE, ILLUMINATION SYSTEM USING THE SAME AND ILLUMINATION ADJUSTING METHOD

(75) Inventors: Jiang-Feng Shan, Shenzhen (CN); Lin-Kun Ding, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 425 days.

(21) Appl. No.: 11/967,093

(22) Filed: Dec. 29, 2007

(65) Prior Publication Data
US 2009/0021184 A1    Jan. 22, 2009

(30) Foreign Application Priority Data
Jul. 19, 2007    (CN) .................... 2007 1 0201134

(51) Int. Cl.
*G05F 1/00* (2006.01)
(52) U.S. Cl. .................. 315/307; 315/299; 315/308
(58) Field of Classification Search ............ 315/186, 315/189, 193, 209 R, 210, 224, 225, 226, 315/291, 294, 295, 297, 298, 299, 293, 300, 315/301, 302, 306, 307, 308, 311, 312, 313, 315/315, 314, 320, 360
See application file for complete search history.

(56) References Cited

U.S. PATENT DOCUMENTS

| 3,965,388 | A  | * | 6/1976  | Brisk ........................ 315/155 |
| 6,329,766 | B1 |   | 12/2001 | Liu et al. |
| 6,918,674 | B2 | * | 7/2005  | Drummond et al. ......... 359/604 |
| 6,998,794 | B2 | * | 2/2006  | Kim et al. .................. 315/291 |
| 7,293,891 | B2 |   | 11/2007 | Herold |
| 2001/0024361 | A1 | * | 9/2001 | Suzuki et al. ................. 362/23 |

* cited by examiner

*Primary Examiner*—Douglas W Owens
*Assistant Examiner*—Jianzi Chen
(74) *Attorney, Agent, or Firm*—Frank R. Niranjan

(57) ABSTRACT

An illumination adjusting device for receiving power from a power supply and supplying output voltage to a lighting unit is provided herein. The illumination adjusting device includes a detector for detecting ambient illumination intensity and generating an ambient illumination value according to the ambient illumination intensity; a comparator for comparing the ambient illumination value with a predetermined value, the comparator outputting a first power signal when the ambient illumination value is lower than a predetermined value; an adjustor for adjusting the output voltage according to the first power signal, as a result, light emitted by the lighting unit is controlled within a predetermined illumination intensity range. A related illumination adjusting method is also provided.

20 Claims, 3 Drawing Sheets

ILLUMINATION ADJUSTING DEVICE, ILLUMINATION SYSTEM USING THE SAME AND ILLUMINATION ADJUSTING METHOD

BACKGROUND

1. Field of the Invention

The present invention relates to detecting and adjusting devices, and particularly to an illumination adjusting device and method for adjusting an illumination intensity of a lighting unit.

2. Description of Related Art

Nearsightedness or myopia occurs mostly in our childhood or early teen years (between 8 and 14 years of age). The risk of developing myopia is increased if there is a family history of myopia because myopia is generally hereditary. There may also be links between myopia and prolonged close-up work, such as reading or sitting close to the television, and between myopia and prolonged work in places with inadequate illumination intensity, although there is little scientific evidence for these. Many people use lamps with the same operating voltage in their living rooms and bedrooms. In fact, 250-300 LUX is the correct horizontal illumination intensity range for the living room, 100-150 LUX for the bedroom, and 300-500 LUX for a library. Even if a person has adopted the right lamps there is also a problem, the illumination intensity decreases when the lamps are used. As a result, the illumination intensity may be inadequate when the lamps are used over an extended period of time, and this may affect the people's vision.

Therefore, an improved illumination adjusting device and method are needed to address the aforementioned deficiency and inadequacies.

SUMMARY

An illumination adjusting device for receiving power from a power supply and supplying output voltage to a lighting unit is provided herein. The illumination adjusting device includes a detector for detecting ambient illumination intensity and generating an ambient illumination value according to the ambient illumination intensity; a comparator for comparing the ambient illumination value with a predetermined value, the comparator outputting a first power signal when the ambient illumination value is lower than a predetermined value; an adjustor for adjusting the output voltage according to the first power signal, as a result, the light emitted by the lighting unit is controlled to be within a predetermined illumination intensity range. A related illumination adjusting method is also provided.

Other advantages and novel features of the present invention will become more apparent from the following detailed description of preferred embodiment when taken in conjunction with the accompanying drawings, in which:

DETAILED DESCRIPTION OF THE EMBODIMENTS

Reference will now be made to the drawings to describe a preferred embodiment of the present illumination adjusting device.

Figure 1:
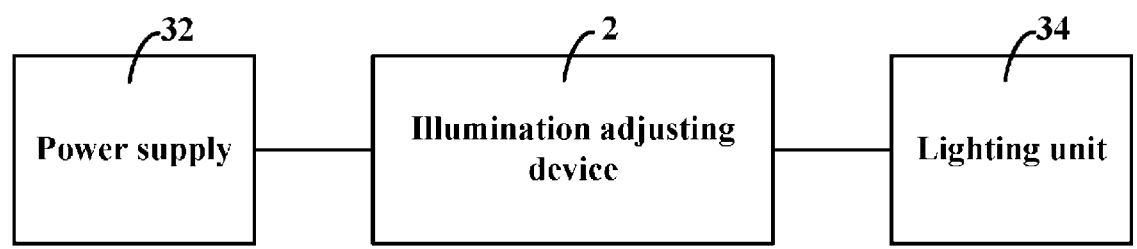
FIG. 1 illustrates a block diagram showing an illumination adjusting device in accordance with an exemplary embodiment.

Referring to FIG. 1, an illumination adjusting device 2 is connected between a power supply 32 and a lighting unit 34. The lighting unit 34 may include at least a fluorescence lamp and/or at least an incandescent lamp, etc. The illumination adjusting device 2 is configured for realizing a plurality of selections including a plurality of illumination intensity ranges, such as a living room intensity range, a bedroom intensity range, and a library intensity range. Thus, the illumination intensity range of the lighting unit 34 can be selected as required. After one of the plurality of illumination intensity ranges is selected (selected illumination intensity range, in a range from 300 LUX to 500 LUX for example), the illumination adjusting device 2 receives power from the power supply 32, and supplies a corresponding output voltage to the lighting unit 34 according to the selected illumination intensity range, as a result, the lighting unit 34 emits light at an illumination intensity corresponding to the selected illumination intensity range. Furthermore, the illumination adjusting device 2 is configured for detecting ambient illumination intensity, and adjusting the output voltage according to the ambient illumination intensity. Thus, the illumination intensity of light emitted by the lighting unit 34 can be controlled to be within the selected illumination intensity range.

Figure 2:
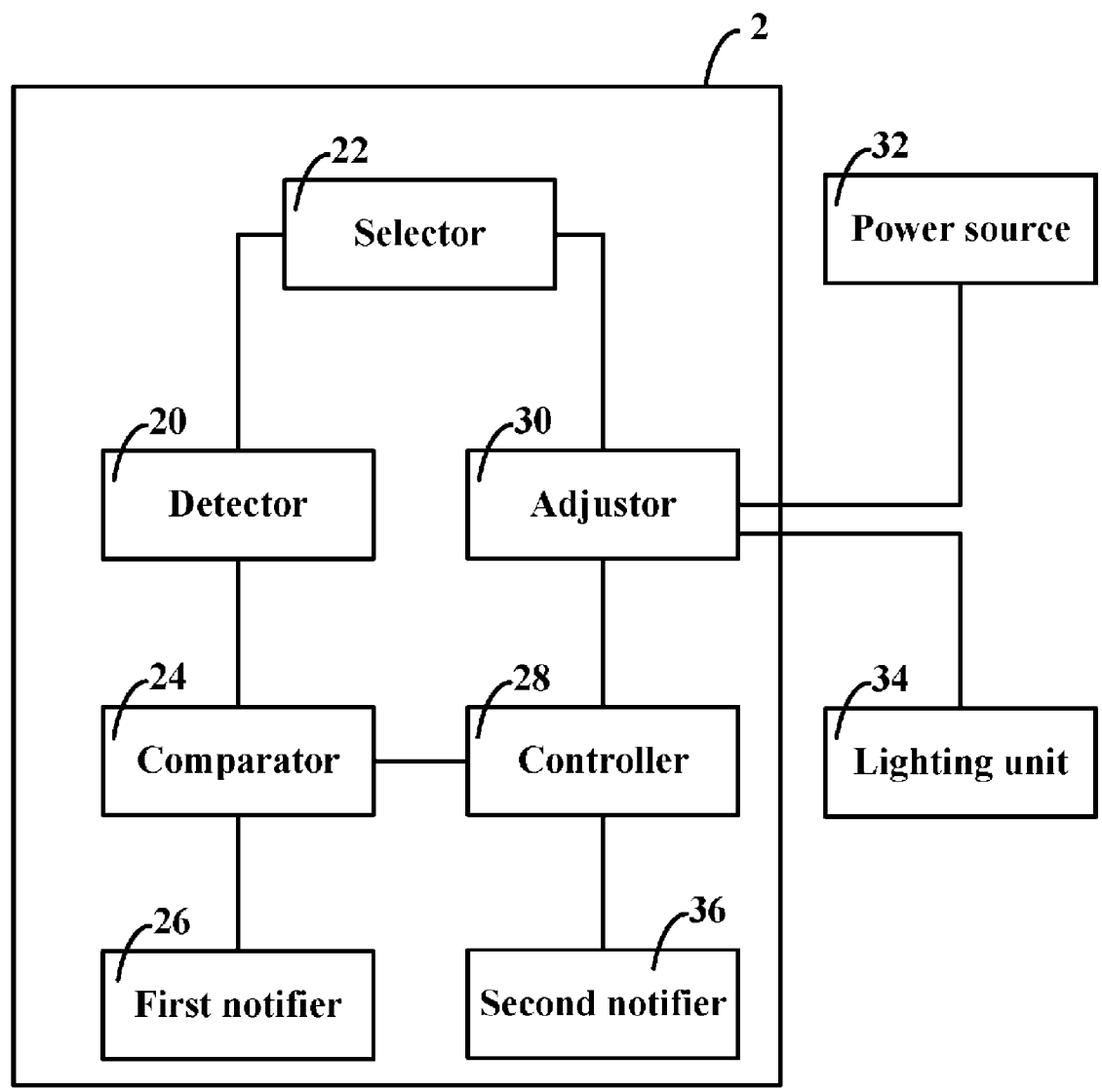
FIG. 2 is a detailed block diagram of the illumination adjusting device of FIG. 1.

Referring to FIG. 2, the illumination adjusting device 2 includes a detector 20, a selector 22, a comparator 24, a first notifier 26, a controller 28, an adjustor 30, and a second notifier 36.

The selector 22 is configured for realizing the number of selections including the plurality of illumination intensity ranges for the user, and outputting a corresponding level signal according to the selected illumination intensity range. The detector 20 is configured for detecting the ambient illumination intensity, and generating a corresponding ambient illumination value according to the ambient illumination intensity.

The comparator 24 is configured for comparing the ambient illumination value with a predetermined value, outputting a first power signal to the first notifier 26 when the ambient illumination value is higher than or equal to the predetermined value, and outputting a second power signal to the controller 28 when the ambient illumination value is lower than the predetermined value. In the embodiment, if the ambient illumination intensity is higher than or equal to a lowest illumination intensity of the selected illumination intensity range, the ambient illumination value is higher than or equal to the predetermined value, if the ambient illumination intensity is lower than the lowest illumination intensity of the selected illumination intensity range, the ambient illumination value is lower than the predetermined value. The first notifier 26 is configured for outputting a first feedback signal to indicate that the ambient illumination intensity is within the selected illumination intensity range. In the preferred embodiment, the first feedback signal is a green light signal.

The controller 28 is configured for generating a third power signal and an adjusting signal in response to the second power signal. The controller 28 outputs the third power signal to the second notifier 36, and outputs the adjusting signal to the adjustor 30. The second notifier 36 is configured for outputting a second feedback signal to indicate that the ambient illumination intensity is outside the selected illumination intensity range. In the preferred embodiment, the second feedback signal may be a red light signal or a sound signal.

The adjustor 30 is configured for adjusting the output voltage supplied to the lighting unit 34, as a result, the light emitted by the lighting unit 34 is controlled to be within the selected illumination intensity range. In detail, the adjustor 30 outputs a corresponding output voltage to the lighting unit 34 in response to the level signal from the selector 22, and increasing the output voltage at a constant rate (by predetermined increments) in response to the adjusting signal from the controller 28.

Figure 3:
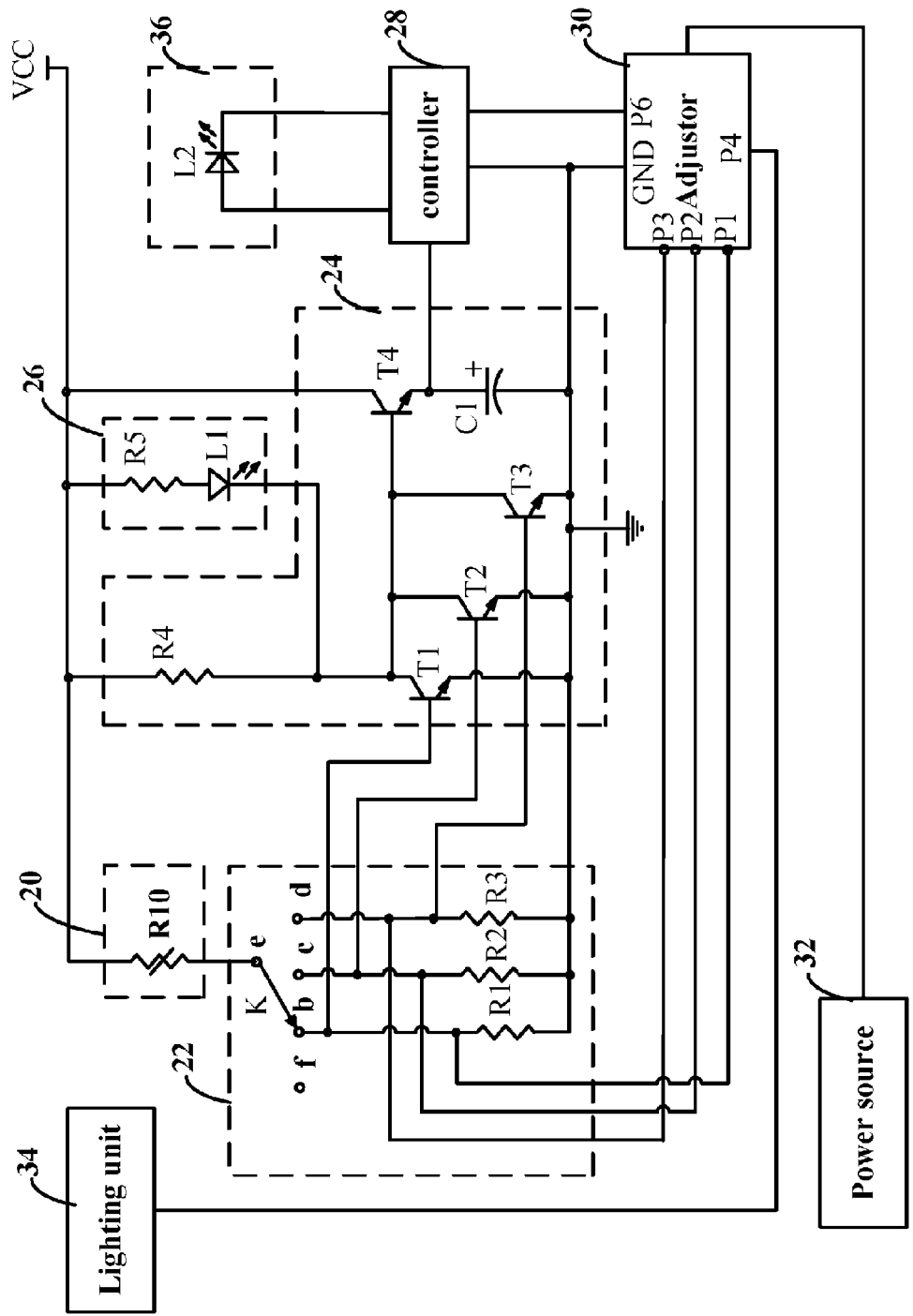
FIG. 3 is a circuit of illumination adjusting device of FIG. 1.

Referring to FIG. 3, the detector 20 includes a photoconductive unit. The photoconductive unit may be a photoconductive cell, or a photodiode, etc. In the preferred embodiment, the photoconductive unit is a photoconductive cell R10 in which resistance decreases when surrounding illumination intensity increases. The selector 22 includes resistors R1, R2, R3, and a switch K. The comparator 24 includes a resistor R4, bipolar junction transistors (BJTs) T1, T2, T3, T4, and a capacitor C1. The first notifier 26 includes a resistor R5 and a light-emitting diode (LED) L1. The second notifier 36 includes a LED L2 connected to the controller 28. The controller 28 is a control integrate circuit, such as the chip model PIC16F877A. The adjustor 30 is an integrate circuit including integrated lighting unit driver with digital and pulse-width modulation (PWM) brightness control.

The adjustor 30 includes a first input port P1, a second input port P2, a third input port P3, a output port P4 connected to the lighting unit 34, a ground port GND grounded, and a control port P6 connected to the controller 28. An end of the photoconductive cell R10 is connected to a voltage collector to collector (VCC) source that supplies voltage of +5 volts. The other end of the photoconductive cell R10 is connected to the switch K. The switch K includes four fixed contacts ("b," "c," "d," and "f") and a moveable contact ("e") that is movable with respect to the fixed contacts. The contact "b" is connected to a first input port of the adjustor 30, an end of the resistor R1, and a base of the BJT T1. The contact "c" is connected to a second input port of the adjustor 30, an end of the resistor R2, and a base of the BJT T2. The contact "d" is connected to a third input port of the adjustor 30, an end of the resistor R3, and a base of the BJT T3. The other ends of the resistors R1, R2, R3 are grounded. The collectors of the BJT T1, T2, T3, and the base of the BJT T4 are connected to an end of the resistor R4 and a cathode of the LED L1. The emitters of the BJT T1, T2, T3 are grounded. The other end of the resistor R4 is connected to the VCC source. An anode of the LED L1 is connected to the VCC source via the resistor R5. The collector of the BJT T4 is connected to the VCC source. The emitter of the BJT T4 is connected to the controller 28 and an anode of the capacitor C1. The cathode of the capacitor C1 is grounded. The LED L2 is connected to the controller 28.

In operation, the contact "b" of the switch K corresponds to a first illumination intensity range, the living room intensity range (250-300 LUX) for example. The contact "c" of the switch K corresponds to a second illumination intensity range, the bedroom intensity range (100-150 LUX) for example. The contact "d" of the switch K corresponds to a third illumination intensity range, the library intensity range (300-500 LUX), for example. The contact "f" is configured for turning off the lighting unit 34. When the moveable contact "e" is connected to the contact "f," the adjustor 30 has no output, thus the lighting unit 34 is turned off.

For example, if the first illumination intensity range is selected, that is, the contact "e" is connected to the contact "b," the adjustor 30 receives a voltage (that is, the level signal) via the first input port P1 and outputs a first output voltage to the lighting unit 34. Thus the lighting unit 34 emits light within the first illumination intensity range. If a first voltage (that is, the ambient illumination value) applied on the resistor R1 is higher than or equal to the predetermined value (0.7 volts for example), the BJT T1 turns on. A third voltage (that is, the first power signal) is applied to the cathode of the LED L1 and the base of the BJT T4. As a result, the BJT T4 turns off, and the LED L1 is turned on and outputs the first feedback signal to indicate that the ambient illumination intensity is within the first illumination intensity range.

However, the illumination intensity decreases when the lighting unit 34 is used over an extended period of time. As the ambient illumination intensity decreases, the resistance of the photoelectric cell R10 increases accordingly. Therefore, a second voltage applied on the photoelectric cell R10 increases and the first voltage applied on the resistor R1 decreases. When the ambient illumination intensity becomes lower than a lowest illumination intensity of the first illumination intensity range, and the first voltage becomes lower than the predetermined value (0.7 volts for example), the BJT T1 turns off, the 5 volts voltage is applied to the cathode of the LED L1 and the base of the BJT T4. Thus, the LED L1 is turned off, and the BJT T4 turns on to output a current (that is, the second power signal) to the controller 28. The controller 28 generates the third power signal and the adjusting signal in response to the second power signal. In response to the third power signal, the second notifier 36 outputs the second feedback signal to indicate that the ambient illumination intensity is outside the selected illumination intensity range. In response to the adjusting signal, the adjustor 30 increases the output voltage at a constant rate. As a result, the light emitted by the lighting unit 34 is controlled within the first illumination intensity range.

In the other embodiments, the resistor R4 and the controller 28 can be omitted, the LED L2 can be connected between the VCC source and the collector of the BJT T4, and the control port P6 of the adjustor 30 can be connected to the emitter of the BJT T4. As described above, the ambient illumination intensity can be maintained within a predetermined illumination intensity range, thus a user's vision can be protected.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An illumination adjusting device for receiving power from a power supply and supplying output voltage to a lighting unit, comprising:
    a selector for realizing a plurality of selections comprising a plurality of predetermined illumination intensity ranges, and generating a corresponding level signal according to a selection of a predetermined illumination intensity range;
    a detector for detecting ambient illumination intensity and generating an ambient illumination value according to the ambient illumination intensity;
    a comparator for comparing the ambient illumination value with a predetermined value of the selection of the predetermined illumination intensity range, the comparator outputting a first power signal when the ambient illumination value is lower than [a]the predetermined value of the selection of the predetermined illumination intensity range; and an adjustor for outputting a corresponding output voltage to the lighting unit in response to the level signal from the selector, and adjusting the output voltage according to the first power signal, wherein light emitted by the lighting unit is controlled within a predetermined illumination intensity range.

2. The illumination adjusting device as described in claim 1, further comprising a controller for generating an adjusting signal in response to the first power signal; the adjustor adjusts the output voltage at a constant rate in response to the adjusting signal.

3. The illumination adjusting device as described in claim 2, further comprising a first notifier for outputting a first feedback signal to indicate that the ambient illumination intensity is within the selected illumination intensity range.

4. The illumination adjusting device as described in claim 3, wherein the first notifier comprises a fifth resistor and a light-emitting diode connected in series between the voltage reference source and the the comparator.

5. The illumination adjusting device as described in claim 2, further comprising a second notifier for outputting a second feedback signal to indicate that the ambient illumination intensity is outside the selected illumination intensity range.

6. The illumination adjusting device as described in claim 1, wherein the detector comprises a photoconductive cell with one end connected to a voltage reference source and another end connected to the selector.

7. The illumination adjusting device as described in claim 6, wherein the selector comprises a first resistor, a second resistor, a third resistor, and a switch with a moveable contact, a first, a second the a third fixed contacts; the first fixed contact is grounded via the first resistor, the second fixed contact is grounded via the second resistor, the third fixed contact is grounded via the third resistor.

8. The illumination adjusting device as described in claim 7, wherein the adjustor comprises a first input port connected to the first fixed contact, a second input port connected to the second fixed contact, a third input port connected to the third fixed contact, a output port connected to the lighting unit, a ground port grounded, and a control port connected to the controller.

9. The illumination adjusting device as described in claim 8, wherein the comparator comprises a first, a second, a third, and a fourth bipolar junction transistors;

a base of the first bipolar junction transistor is connected to the first fixed contact, a base of the second bipolar junction transistor is connected to the second fixed contact, a base of the third bipolar junction transistor is connected to the third fixed contact, the collectors of the first, second, and third bipolar junction transistors are connected to the voltage reference source via a resistor, the emitters of the first, second, and third bipolar junction transistors are grounded; the base of the fourth bipolar junction transistor is connected to the collector of the first bipolar junction transistors, the collector is connected to the voltage reference source, the emitter is grounded via a capacitor.

10. An illumination adjusting method for receiving power from a power supply and supplying output voltage to a lighting unit, comprising:

realizing a plurality of selections comprising a plurality of predetermined illumination intensity ranges;

generating a corresponding level signal according to a selection of a predetermined illumination intensity range;

outputting a corresponding output voltage to the lighting unit in response to the level signal from the selector;

detecting ambient illumination intensity;

generating an ambient illumination value according to the ambient illumination intensity;

comparing the ambient illumination value with a predetermined value of the selection of the predetermined illumination intensity range;

outputting a first power signal if the ambient illumination value is lower than a predetermined value of the selection of the predetermined illumination intensity range; and adjusting the output voltage according to the first power signal so as to keep the light emitted by the lighting unit being controlled within a predetermined illumination intensity range.

11. The illumination adjusting method as described in claim 10, further comprising:

generating a feedback signal to indicate that the ambient illumination intensity is within the selected illumination intensity range.

12. The illumination adjusting method as described in claim 10, further comprising:

generating a feedback signal to indicate that the ambient illumination intensity is outside the selected illumination intensity range.

13. An illumination system capable of adjusting illumination intensity according to ambient illumination intensity, comprising:

a lighting unit; and an illumination adjusting device electrically connected to the lighting unit, for obtaining output voltage from a power supply to power the lighting unit, wherein the illumination adjusting device comprises:

a selector for realizing a plurality of selections comprising a plurality of predetermined illumination intensity ranges, and generating a corresponding level signal according to a selection of a predetermined illumination intensity range;

a detector for detecting ambient illumination intensity and generating an ambient illumination value according to the ambient illumination intensity;

a comparator for comparing the ambient illumination value with a predetermined value of the selection of the predetermined illumination intensity range, the comparator outputting a first power signal when the ambient illumination value is lower than the predetermined value of the selection of the predetermined illumination intensity range; and an adjustor for outputting a corresponding output voltage to the lighting unit in response to the level signal from the selector, and adjusting the output voltage according to the first power signal, whereby illumination intensity of the lighting unit is adjusted.

14. The illumination system as described in claim 13, further comprising a controller for generating an adjusting signal in response to the first power signal; the adjustor adjusts the output voltage at a constant rate in response to the adjusting signal.

15. The illumination system as described in claim 14, wherein the selector comprises a first resistor, a second resistor, a third resistor, and a switch with a moveable contact, a first, a second the a third fixed contacts; the first fixed contact is grounded via the first resistor, the second fixed contact is grounded via the second resistor, the third fixed contact is grounded via the third resistor.

16. The illumination system as described in claim 15, wherein the adjustor comprises a first input port connected to the first fixed contact, a second input port connected to the second fixed contact, a third input port connected to the third fixed contact, a output port connected to the lighting unit, a ground port grounded, and a control port connected to the controller.

17. The illumination system as described in claim 16, wherein the comparator comprises a first, a second, a third, and a fourth bipolar junction transistors; a base of the first bipolar junction transistor is connected to the first fixed contact, a base of the second bipolar junction transistor is connected to the second fixed contact, a base of the third bipolar junction transistor is connected to the third fixed contact, the collectors of the first, second, and third bipolar junction transistors are connected to the voltage reference source via a resistor, the emitters of the first, second, and third bipolar junction transistors are grounded; the base of the fourth bipolar junction transistor is connected to the collector of the first bipolar junction transistors, the collector is connected to the voltage reference source, the emitter is grounded via a capacitor.

18. The illumination system as described in claim 17, further comprising a first notifier for outputting a first feedback signal to indicate that the ambient illumination intensity is within the selected illumination intensity range, the first notifier comprising a fifth resistor and a first light-emitting diode connected in series between the voltage reference source and the collector of the first bipolar junction transistor.

19. The illumination system as described in claim 17, further comprising a second notifier for outputting a second feedback signal to indicate that the ambient illumination intensity is outside the selected illumination intensity range, the second notifier comprising a second light-emitting diode connected to the collector of the fourth bipolar junction transistor.

20. The illumination system as described in claim 13, wherein the detector comprises a photoconductive cell with one end connected to a voltage reference source and another end connected to the selector.

* * * * *